(No Model.)
G. W. KORTRIGHT & C. M. CRAVEN.
BICYCLE.
No. 498,172. Patented May 23, 1893.
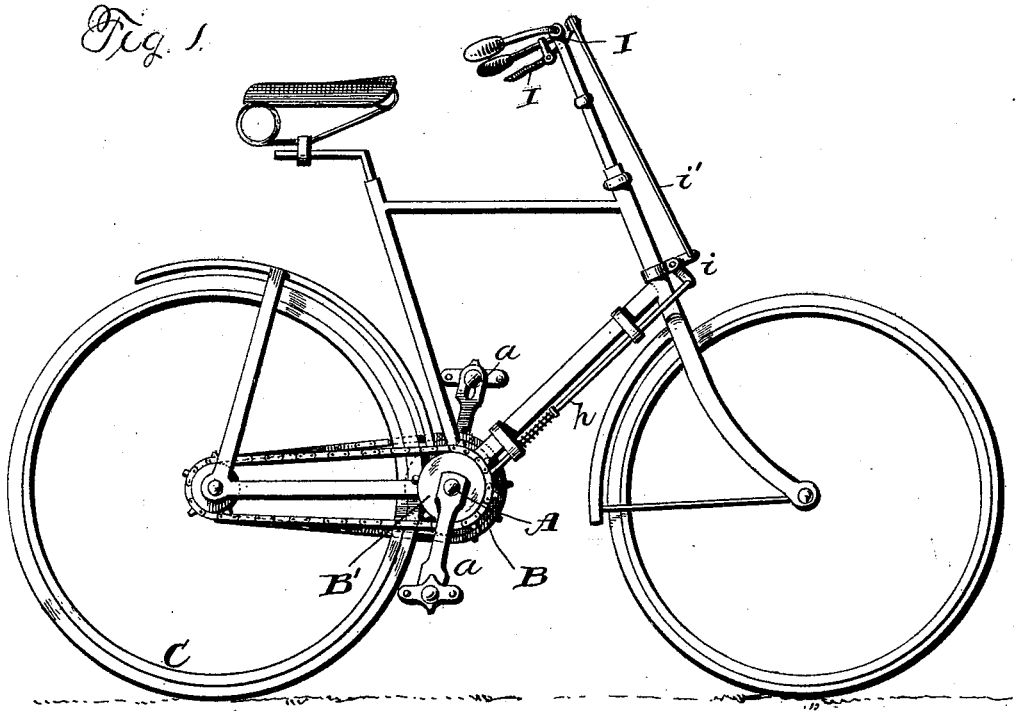
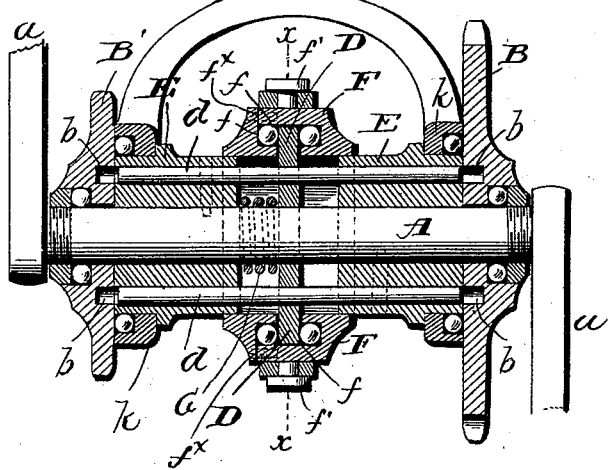
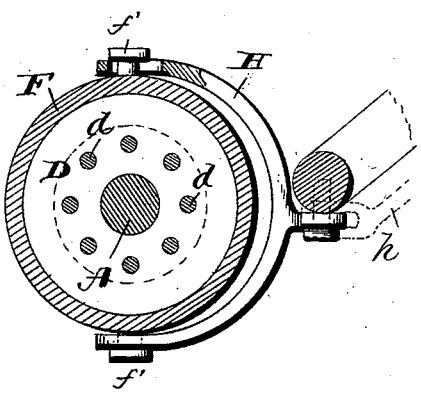
Witnesses
C. J. Williamson
P. J. Rogers
Inventors
George W. Kortright &
Charles M. Craven,
by Franklin H. Hough
their Attorney

# UNITED STATES PATENT OFFICE.

GEORGE W. KORTRIGHT AND CHARLES M. CRAVEN, OF WAYNE, NEBRASKA.

BICYCLE.

SPECIFICATION forming part of Letters Patent No. 498,172, dated May 23, 1893.

Application filed November 26, 1892. Serial No. 453,203. (No model.)

*To all whom it may concern:*

Be it known that we, GEORGE W. KORTRIGHT and CHARLES M. CRAVEN, citizens of the United States, residing at Wayne, in the county of Wayne and State of Nebraska, have invented certain new and useful Improvements in Bicycles; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to bicycles of that type employing sprocket wheels and chains to transmit the motion of the pedals to the driving-wheel, and our object is to provide means whereby the gearing can be changed to secure power or speed; and be wholly disconnected from the cranks or pedals, so that the latter, when desired, as in coasting, need not rotate, thus saving unnecessary wear of the pedals, shaft and bearings.

To these ends the invention consists in the employment of two independent sets of sprocket gearing that in part comprehend two sprocket wheels of different diameters, which are adapted to be automatically connected by a clutch device with the crank or pedal shaft, and also to be wholly disconnected therefrom, all as more particularly hereinafter set forth.

In the accompanying drawings, in which the invention is clearly illustrated, Figure 1, is a side view of a bicycle provided with our mechanism. Fig. 2, is a section taken axially through the crank-shaft. Fig. 3 is a transverse section on the line $x, x$ of Fig. 2 and Fig. 4 is a detail view of a portion of the clutch lever.

Referring now to the details of the drawings by letter, A designates the crank or pedal shaft, $a, a$, the two pedals secured in any of the usual ways to the ends thereof, and B, and B', two sprocket-wheels journaled loosely on said shaft, said wheels being, as shown, respectively of large and small diameters.

Each sprocket wheel is connected by its own chain with a sprocket wheel on the axle of the rear driving wheel C and either, by means to be described, is adapted to be coupled with the crank-shaft, to apply power to said driving wheel.

Encircling the shaft A at its central portion and capable of movement in an axial direction thereon, is a circular plate or annulus D, to which are fixedly attached a number of rods or bars $d, d$, preferably eight, that extend the same distance on opposite sides thereof, parallel with each other and the axis of the shaft. These rods have a length a trifle less than the distance between the inner faces of the wheels B and B', and are adapted to have their ends when moved longitudinally, enter openings $b$, in either one wheel or the other; each wheel being as shown, provided with a number of such openings, corresponding to the number of the rods.

On each side of the annulus D, and of less diameter than it, is a short cylinder E, that encircles and is bolted or keyed to the shaft A, so as to turn therewith, and is provided with openings through which the rods $d$ slide, and which thus connect said rods to the shaft and enable the latter to be connected with one or the other sprocket wheel according as the rods are adjusted. Sufficient space is left between the annulus D and the inner ends of the cylinders E, to allow the necessary movement of the annulus in an axial direction to clutch one wheel or the other by the rods $d$. This space is bridged over by a sleeve F, divided, as at $f^{\times}$ forming a dust-guard that encircles said annulus and moves with it axially and has such length axially as always to cover such space whatever be its position in an axial direction. The sleeve and annulus are coupled so as to move together, by fitting the latter in an internal circumferential groove $f$ in the sleeve.

The shaft A, and the larger sprocket-wheel are normally kept clutched together by means of a spiral spring G that encircles the shaft and bears at one end against the annulus D and at the other against the proper cylinder E.

The clutch rods are shifted against the tension of the spring, either to engage the smaller sprocket-wheel or to be placed in a mid position, by a forked clutch lever H pivoted to the machine frame and engaging diametrically disposed pins $f'$ on the sleeve F. Said clutch lever is connected by a rod $h$ guided in clips attached to the frame to a bell-crank lever *i* pivoted to the front fork of the machine, and said lever *i*, is in turn connected by a rod *i'* with a hand lever I pivoted to the handle-bar of the bicycle in position to be engaged by the left hand of the rider. By manipulation of this lever, which is like the ordinary brake lever, the clutch can be disengaged from the large sprocket, and either placed in engagement with the small, or in a mid position, so that in coasting, simply the wheels B and B' will turn loosely on the shaft A, and the pedals will not revolve.

The outer ends of the cylinders E are journaled in boxes *k* on the machine frame, that are provided with ball bearings, and ball bearings are provided for the sprocket wheels on the shaft A.

Preferably balls will be placed between the sides of the annulus D and the walls of the groove *f* in the sleeve F. Instead of fastening the cylinders E to the shaft, it will be apparent that the annulus D might be keyed to, or splined thereto; instead. It will also be apparent that other changes may be made in the construction of the parts that will involve mere mechanical skill and not constitute a departure from the scope of the invention.

What we claim to be new, and desire to secure by Letters Patent, is—

1. In a bicycle, in combination, the crank-shaft, the two wheels loose thereon, the annulus between said wheels, the rods carried by the annulus to clutch with either wheel, the cylinder upon each side of the annulus attached to the shaft, the spring to press said annulus and the balls in a groove in said sleeve upon opposite sides of said annulus with the rods in one direction, and the sleeve encircling the annulus and the inner ends of the cylinders and having a circumferential internal groove into which the annulus fits, substantially as described.

2. In a bicyle, in combination, the driving shaft, the two sprocket wheels loosely mounted thereon, the annulus between said wheels, the rods carried by the annulus to clutch with either wheel, the cylinder attached to the shaft, the spring to press said annulus with the rods in one direction, substantially as described.

In testimony whereof we affix our signatures in presence of two witnesses.

GEORGE W. KORTRIGHT.
CHARLES M. CRAVEN.

Witnesses:
ARTHUR P. CHILDS,
GEORGE W. RILEY.